United States Patent [19]

Fancher

[11] Patent Number: 4,884,423

[45] Date of Patent: Dec. 5, 1989

[54] VEHICLE LOCK ASSEMBLY OPERABLE WITH TRANSMISSION SHIFTER AND METHOD

[75] Inventor: Ricky L. Fancher, Greeneville, Tenn.

[73] Assignee: Hurd Lock and Manufacturing Co., Inc., Greeneville, Tenn.

[21] Appl. No.: 216,878

[22] Filed: Jul. 7, 1988

[51] Int. Cl.$^4$ ............................................. E05B 65/12
[52] U.S. Cl. ........................................ 70/248; 70/252
[58] Field of Search ................ 70/248, 252, 247, 237, 70/360; 74/878, 483 PB, 475, 538, 850, 483 R

[56] References Cited

U.S. PATENT DOCUMENTS

| | | | |
|---|---|---|---|
| 3,686,906 | 8/1972 | Watkins | 70/360 |
| 3,703,092 | 11/1972 | Elliott | 70/248 |
| 3,887,029 | 6/1975 | Lipechutz et al. | 180/114 |
| 3,949,581 | 4/1976 | Toyama et al. | 70/239 |
| 4,052,869 | 10/1977 | Weber | 70/360 |
| 4,249,404 | 2/1981 | Kimberlin | 70/248 |
| 4,270,624 | 6/1981 | Jessop | 180/287 |
| 4,304,112 | 12/1981 | Osborn | 70/247 |
| 4,474,085 | 10/1984 | DeVogelaero | 70/248 |
| 4,520,640 | 1/1985 | Kramer | 70/248 |
| 4,712,397 | 12/1987 | Niskanen | 70/248 |
| 4,724,722 | 2/1988 | Beauch | 74/850 |

FOREIGN PATENT DOCUMENTS

2160485 12/1985 United Kingdom .................. 70/248

*Primary Examiner*—Robert L. Wolfe
*Attorney, Agent, or Firm*—Luedeka, Hodges & Neely

[57] ABSTRACT

A steering lock assembly and method for utilization in a vehicle having a transmission control member mounted for movement between a PARK mode position and a non-PARK mode position utilizes a key-operable switch including a housing mountable in a generally stationary condition within the vehicle and a keyway cylinder mounted within the housing for rotational movement relative thereto between positions corresponding to LOCK and non-LOCK modes of the switch. The lock assembly includes a locking mechanism associated with the switch for locking the steering arrangement of the vehicle when and only when the keyway cylinder is positioned in the LOCK mode position, and a camming arrangement is mounted adjacent the keyway cylinder and connectable to the transmission control member for movement therewith. The camming arrangement is adapted to cooperate with the keyway cylinder so that when the transmission control member is positioned in a non-PARK mode position and the keyway cylinder is positioned in a non-LOCK position of rotational movement, the keyway cylinder is prevented from being rotated from the non-LOCK mode position to the LOCK mode position. Hence, the camming arrangement prohibits the steering arrangement from being locked by the locking mechanism as long as the transmission control member is positioned in a non-PARK mode.

28 Claims, 2 Drawing Sheets

VEHICLE LOCK ASSEMBLY OPERABLE WITH TRANSMISSION SHIFTER AND METHOD

BACKGROUND OF THE INVENTION

This invention relates generally to steering lock assemblies for vehicles and relates more particularly to a steering lock assembly for a vehicle having a movable transmission control member and wherein the steering lock assembly utilizes a key-operable switch responsible for locking the steering arrangement of a vehicle when the switch is in a predetermined position or mode.

The key-operated switch of a steering lock assembly with which this invention is concerned commonly includes a housing and a keyway cylinder or core operatively mounted within the cylinder for rotation relative thereto between preselected rotational positions. The keyway cylinder defines a key-accepting slot in one end thereof and cooperates with the housing in such a manner that the cylinder is prevented from rotating relative to the housing unless the key is operatively positioned within the slot. Furthermore, the cylinder commonly includes means for preventing the withdrawal of the key unless the cylinder is positioned in a preselected rotational position relative to the housing. For example and in a switch in which a first rotational position corresponds to a LOCK mode and alternative rotational positions correspond to ACCESSORY, ON and START modes, the key is commonly prevented from withdrawal from the key-accepting slot in any rotational position except the LOCK mode.

The steering lock assembly further includes means for locking the steering arrangement of the vehicle if the key-operated switch is in a preselected position, such as that position corresponding to the LOCK mode. When operatively associated with a steering arrangement having a steering shaft rotatably mounted within a stationary casing or column, such locking means commonly operate to lock the steering shaft to the casing to thereby prevent rotation of the shaft if and only if the switch is in the preselected rotational position. In operation, the locking means of the assembly deters theft of the vehicle by an individual who does not possess the key for the switch.

It is conceivable that in vehicles utilizing the aforedescribed key-operated switch and the associated means for locking the steering arrangement of the vehicle, the switch may be positioned in the predetermined, or LOCK mode, position while vehicle is in motion. Motion of the vehicle is commonly permitted only if the transmission shift lever of the vehicle, positionable in any of several positions corresponding to PARK and non-PARK modes, is positioned in any mode other than the PARK mode. If the switch is moved to the LOCK mode position while the vehicle is moving, the steering wheel locks and an accident involving the vehicle may result. It would be desirable to provide a steering LOCK assembly for a vehicle having a key-operated switch which is prevented from being moved to a position corresponding to a LOCK mode if the transmission shift lever is positioned in any position except that position which corresponds to the PARK mode.

Accordingly, it is an object of the present invention to provide a new and improved steering lock assembly having a key-operable switch such as aforedescribed wherein the switch is prevented from being moved into the preselected position at which withdrawal of a key from the switch is permitted and the steering arrangement of the vehicle is locked unless the transmission of the vehicle is in a PARK mode, and a method of preventing such movement of the switch into the preselected position.

Another object of the present invention is to provide such a steering lock assembly wherein the rotational movement of the keyway cylinder of the key-operable switch is prevented from being moved to the preselected position as a consequence of the transmission shift lever being in a non-PARK mode.

Still another object of the present invention is to provide such an assembly having a keyway cylinder adapted to move longitudinally of the housing and wherein the cylinder is permitted to move longitudinally as aforesaid whether or not the vehicle transmission is in a non-PARK mode.

A further object of the present invention is to provide such an assembly for preventing the movement of the transmission shift lever out of the PARK mode position when the keyway cylinder is positioned in the LOCK mode.

A yet still another object of the present invention is to provide such an assembly which is well-suited for incorporation with the ignition system of a vehicle wherein the key-operated switch provides an ignition switch for the vehicle.

A still further object of the present invention is to provide such an assembly which is uncomplicated in construction and effective in operation.

SUMMARY OF THE INVENTION

In accordance with the present invention, there is provided a steering lock assembly and method for utilization in a vehicle having a transmission control member mounted within the vehicle for movement between one position corresponding to a PARK mode and another position corresponding to a non-PARK mode.

The steering lock assembly includes a key-operable switch having a housing mountable in a generally stationary condition within the vehicle and a keyway cylinder mounted within the housing for rotational movement relative thereto between first and second positions of rotational movement and wherein the first position corresponds to the only position at which a key can be withdrawn from the cylinder. The assembly further includes means associated with the switch housing for locking the steering arrangement of the vehicle when the keyway cylinder is positioned in the first position. Still further, mechanical means are associated with the housing for coupling to the transmission control member for movement therewith and for cooperating with the keyway cylinder so that when the transmission control member is positioned in a position corresponding to a non-PARK mode, the keyway cylinder is prevented from being rotated from the second position to the first position. Because the keyway cylinder is prevented from being rotated as aforesaid, the vehicle steering arrangement cannot be locked by the locking means unless the transmission control member is positioned in the non-PARK mode position.

The method of the invention includes the step involved in preventing the movement of the key-operated switch between switch modes including the step of preventing the movement of the keyway cylinder from the second position of rotational movement to the first position when the transmission control member is positioned out of the PARK mode position.

DETAILED DESCRIPTION OF THE ILLUSTRATED EMBODIMENT

Figures 1, 2:
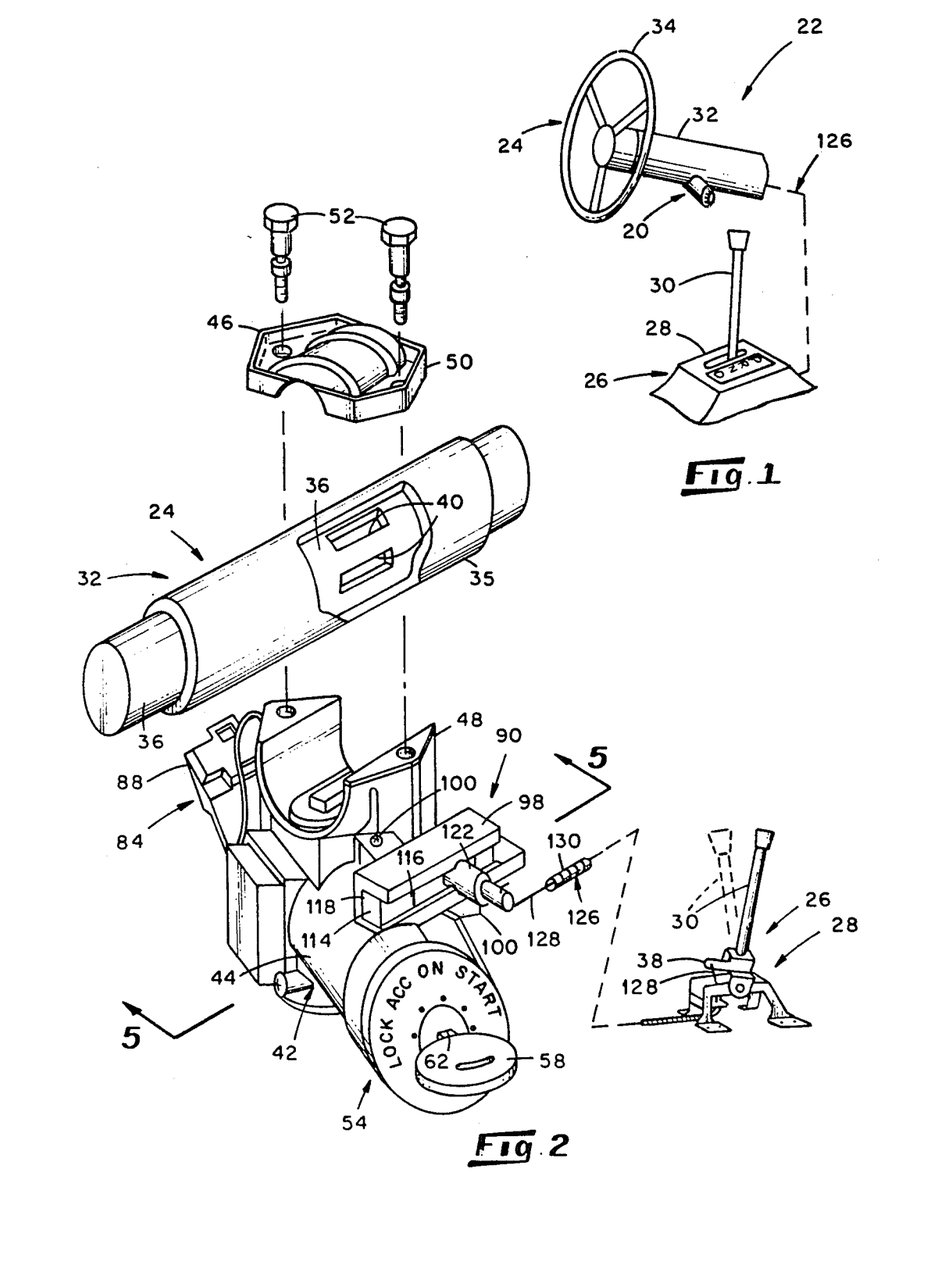
FIG. 1 is a diagrammatic view of a vehicle steering column in which an embodiment of the steering lock assembly in accordance with the present invention is incorporated and a shift console for the vehicle transmission.
FIG. 2 is a perspective view of the steering lock assembly of the FIG. 1 steering column and illustrating in diagrammatic form the interaction between the steering lock assembly and the steering arrangement and shift console of the vehicle.

Turning now to the drawings in greater detail and considering first FIG. 1, there is illustrated a vehicle environment in which an embodiment, generally indicated 20, of a steering lock assembly in accordance with the present invention is utilized. More specifically, there is depicted in FIG. 1 a vehicle, generally indicated 22, including a transmission 26 and a steering arrangement 24 from which the steering lock assembly 20 is supported. The steering lock assembly 20 includes a key-operated switch assembly 54, described herein, which operates as an ignition switch for the vehicle 22. Accordingly, the switch assembly 54 is appropriately wired to the appropriate ignition components (not shown) of the vehicle 22. The steering lock assembly 20 is adapted to prevent the locking up of the steering arrangement as long as the transmission is positioned in any transmission mode in which motion of the vehicle 22 is positioned.

With reference to FIGS. 1 and 2, in the depicted embodiment the transmission 26 includes a shift console 28 including a manual control lever 30 mounted within the floor of the vehicle 22 and which is movable about an axis of pivot between four preselected positions (i.e., PARK and non-PARK positions) of movement relative to the remainder of the shift console 28 which positions correspond, in sequence, to PARK, REVERSE, NEUTRAL and DRIVE modes of the vehicle transmission. As is the case with most vehicles, the drive wheels of the vehicle 22 are locked against movement by the vehicle transmission 26 when the transmission 26 is arranged in the PARK mode.

The steering arrangement 24 includes a steering column 32 which extends generally toward the driver of the vehicle 22 and which terminates in a steering wheel 34. As best shown in FIG. 2, the steering column 32 includes a casing 35 which remains stationary within the vehicle 20 and a steering shaft 36 mounted for rotation within the casing 35 and which can be rotated or turned by means of the steering wheel 26 Defined longitudinally of and regularly spaced about the periphery of the shaft 36 is a series of splines or slots 40. As is described in greater detail herein, the steering lock assembly 20 is mounted within the steering column 32 and operatively coupled to the transmission 26 for selectively locking and unlocking the steering arrangement 24 of the vehicle 22 and for preventing the locking of the steering arrangement 24 unless the transmission 26 is arranged in the PARK mode.

With reference still to FIG. 2, the depicted transmission shift console 28 includes a control member 38 operatively associated with the manual shift lever 30 for movement therewith as the shift lever 30 is manually moved between any of the PARK and non-PARK modes of the transmission. To this end, the control member 38 is spaced from the axis of pivot of the shift lever 30 so that pivotal movement of the lever 30 about its axis such as, for example, between a condition illustrated in solid lines in FIG. 2 and a condition illustrated in phantom in FIG. 2, effects a displacement of the control member 38 relative to the remainder of the console 28 by a corresponding amount. As is explained herein, the steering lock assembly 20 is operatively coupled to the transmission 26 by way of the control member 38 and adapted to cooperate with the slots 40 of the steering shaft 36 for selectively locking or unlocking the steering arrangement 24 upon the occurrence of a predetermined event.

With reference still to FIG. 2, the steering lock assembly 20 includes housing means in the form of a hollow casing 42 having a cylindrical housing 44 and a clamping arrangement 46 operatively associated with the cylindrical housing 44. The clamping arrangement 46 includes a base section 48 intregally joined to so as to extend from one side of the cylindrical housing 44 and a cooperating attachment section 50 for securement of the casing 42 about the steering column casing 35. Each of the base and attachment sections 48 and 50, respectively, define recesses which are generally C-shaped in cross-section and adapted to be fitted about a corresponding side of the casing 35 of the steering column 32 and clamped thereabout in a pipe-clamp fashion by means of bolts 52.

Figure 3:
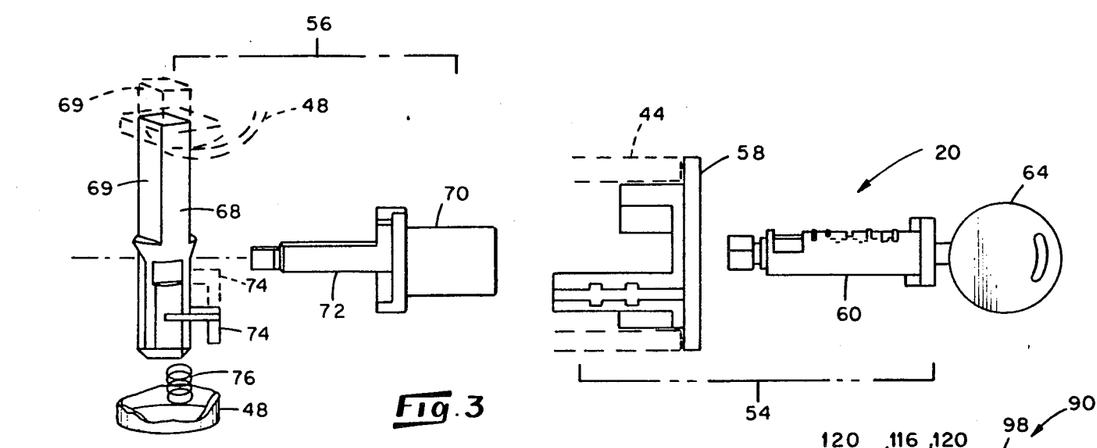
FIG. 3 is a perspective view of the key-operated switch of the FIG. 2 assembly, shown exploded.

With reference to FIGS. 2 and 3, the steering lock assembly 20 includes a key-operated switch assembly 54 mounted within one end of the cylindrical housing 44 of the casing 46 and an associated latch bolt assembly 56 coupled to the switch assembly 54. The switch assembly 54 includes a housing 58 having a main body portion which is received by the axial cavity of the cylindrical housing 44 so as to be positioned in axial alignment therewith and a key-operated cylinder 60 operatively mounted within the housing 58 for rotation relative thereto. The cylinder 60 defines a keyway slot 62 in one end thereof for receiving a key 64 inserted therein and cooperates with the housing 58 in a manner which is well-known in the art to permit rotation of the cylinder 60 relative to the housing 58 between preselected rotational positions about the longitudinal axis of the cylindrical housing 44 as the key 64 is operatively positioned in the keyway slot 62. As mentioned earlier, the switch assembly 54 operates as the ignition switch for the vehicle and, accordingly, the cylinder 60 of the switch assembly 54 is rotatable relative to the housing 58, by means of the key 64, between one rotational position corresponding to a LOCK mode and three rotational (i.e., non-LOCK) positions corresponding in sequence to ACCESSORY, ON and START modes.

Figure 4:
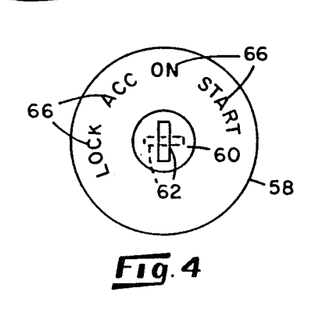
FIG. 4 is an end elevation view of the housing of the switch of the FIG. 2 assembly as seen from the right in FIG. 3.

For purposes of identifying to an operator of the vehicle the aforedescribed rotational positions and as best shown in FIG. 4, appropriate indicia markings 66 are stamped or otherwise etched into the exposed end face of the housing 58. It will be understood that when the cylinder 60 is positioned in any one of the aforedescribed switch modes, the keyway slot 62 aligns with the corresponding indicia mark. For example, when the keyway slot 62 is oriented in the position illustrated in solid lines in FIG. 4, the cylinder 60 is in the switch ON mode position and when the slot 62 is oriented in the position illustrated in phantom in FIG. 4, the cylinder 60 is in the switch LOCK mode position.

The key-operated switch assembly 54 is further characterized in that the cylinder 60 is capable of being moved relative to and along the longitudinal axis (i.e., axially) of the switch housing 58 and cylindrical housing 44 between first and second positions of axial displacement. In this connection, the cylinder 60 is appropriately keyed to the housing 58 so that axial movement of the cylinder 60 between the first and second positions is required before the cylinder 60 can be rotated from one preselected rotational position to another preselected rotational position. In the switch assembly 54, the keyway cylinder 60 is springbiased to a position (shown in solid lines in FIG. 6) at which the keyway slot-end of the cylinder 60 is substantially flush with the indicia-bearing end of the housing 58 from a position (shown in phantom lines in FIG. 6) at which the keyway slot-end of the cylinder 60 is recessed within the indicia-bearing end of the housing 58, and the keyway cylinder 60 is required to be moved from the first condition to the second condition before the cylinder 60 can be rotated out of the ACCESSORY mode position to the LOCK mode position. Such a feature provides a safety-related advantage in that both an axial displacement and a rotational movement of the cylinder 60 is required to move the cylinder 60 to the LOCK mode position so that the key 64 can be withdrawn from the keyway slot 62.

With reference again to FIG. 3, the latch bolt assembly 56 includes a latch bolt 68 mounted within the casing 42 and a cooperating rotational member 70 interposed between the bolt 68 and the key-operated cylinder 60. The latch bolt 68 includes a plug-like body 69 and a tab 74 integrally joined at one end of the body 69. Furthermore, the latch bolt 68 is mounted within the casing 42 for sliding movement along a path oriented generally perpendicular to the longitudinal axis of the sleeve-portion 44 between a lock position, as shown in phantom in FIG. 3, at which a portion of the bolt body 69 extends from the base section 48 of the clamping arrangement 46 and a release position, illustrated in solid lines in FIG. 3, at which the bolt body 69 is retracted within the base section 48. The steering lock assembly 20 is incorporated within the steering column 32 (FIG. 2) so that when the latch bolt 68 is in the lock, or extended position, the bolt 68 is received by one of the slots 40 defined in the steering shaft 36 to lock the shaft 34 in position within the steering column casing 35. Conversely, when the latch bolt 68 is in the release, or retracted position, the steering wheel shaft 34 is free to be rotated relatively to the casing 35 by means of the steering wheel 34.

With reference again to FIG. 2, steering latch assembly 56 includes a spring 76 for biasing the latch bolt 52 from the release position to the lock position, and the rotational member 70 holds the bolt 68 within the release position when the keyway cylinder 60 is positioned in any mode except the LOCK mode. To this end, the rotational member 70 is mounted for rotational movement within the casing 42 and is keyed at one end to the end of the cylinder 60 opposite the keyway slot 62 so that the rotational member 70 must rotate within the casing 42 as the cylinder 60 is rotated within the housing 58. Furthermore, the rotational member 70 includes means defining a camming surface 72 which cooperates with the tab 74 embodied within the latch bolt 68 for forcibly moving the bolt 68 from its lock position to its release position against the force of the spring 76 when the keyway cylinder 60 is moved out of the LOCK mode toward any of the non-LOCK modes and permits the bolt 68 to be moved by the spring 76 to the bolt lock position when the cylinder 60 is moved into the LOCK mode from any of the non-LOCK modes. Hence, the steering arrangement 24 of the vehicle is in a locked condition when the keyway cylinder 60 is positioned in the LOCK mode and in an unlocked condition when the cylinder 60 is positioned in any of the non-LOCK modes.

With reference again to FIG. 2, there is associated with the steering lock assembly 20 means, generally indicated 84, for warning an operator that the key 64 is operatively positioned within the keyway 62 nd positioned in the switch LOCK mode when the engine of the vehicle is not operating. Such warning means 84 includes a switching component 88 attached to the end of the cylindrical housing 44 of the casing 42 for sensing the presence of the key 64 within the keyway slot when the cylinder 60 is positioned in the switch LOCK mode and the operation or nonoperation of the vehicle engine. To this end, the switching component 88 is coupled to the keyway cylinder 60 in a manner well-known in the art for mechanically switching modes of the component 88 between make and break modes upon movement of the key 64 into and out of the keyway slot 62, and the component 88 is electrically connected to the wiring of the vehicle for sensing whether or not the vehicle engine is operating.

Figures 5, 6:
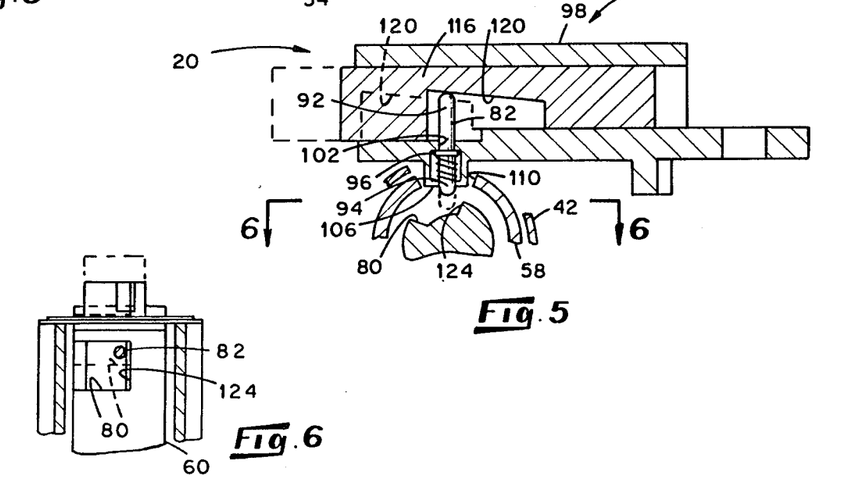
FIG. 5 is a fragmentary cross-sectional view taken about lines 5—5 of FIG. 2.
FIG. 6 is a fragmentary cross-sectional view taken about on lines 6—6 of FIG. 5.

In accordance with the present invention and with reference to FIGS. 2, 5 and 6, the steering lock assembly 20 includes mechanical means, generally indicated 90, interposed between the transmission 26 and the key-manipulable switch assembly 54 so that when the shift lever 30 is positioned in any position corresponding to a non-PARK mode and the switch assembly 54 is positioned in any rotational position corresponding to a non-LOCK mode, the keyway cylinder 60 is prevented from being rotated from the non-LOCK mode to the LOCK mode. In this connection, the keyway cylinder 60 defines a recess 80 in its cylindrical periphery, and the mechanical means 90 includes a stop member in the form of a pin 82 supported adjacent the housing 58 for movement into and out of the recess 80 and in coordination with the movement of the shift lever 30 into and out of the PARK mode when the keyway cylinder 60 is positioned in a non-LOCK mode.

As best shown in FIG. 5, the pin 82 is elongated and cylindrical in shape and defines two opposite rounded end portions 9, 94 and an annular rib 96 positioned generally midway between the end portions 92, 94. For mounting of the pin 82 upon the casing 42, the steering lock assembly 20 includes a rigid guide member 98 of generally tubular geometry fixedly attached to the casing 42 as by means of a screws 100 (FIG. 2). As best shown in FIGS. 2 and 5, the guide member 98 is positioned against the surface of the casing 42 so as to be disposed adjacent the recess-defining end of the keyway cylinder 60. The interior region of the guide member 98 and the interior region of the recess 80 are in communication with one another through an aperture 102 defined in the guide member 98, an opening 104 defined in the casing 42 and a notch 110 defined in the housing 58. Furthermore, a cap-member 106 having an opening therethrough is fixed to the guide member 98 about the aperture 102 defined therein, and the pin 80 is positioned therein so that the pin end portion 92 extends through the aperture 102, the pin end portion 94 extends generally toward the keyway cylinder 60, and the annular rib 96 of the pin 82 is captured between the cap-member 106 and the guide member 98.

With reference again to FIG. 6, the recess 80 includes a generally square opening and, because it is defined in the keyway cylinder 60, must move relative to the housing 58 as the cylinder 60 is moved rotatably therein between switch modes, and longitudinally therein between first and second limits of axial movement. In accordance with the present invention, the recess 80 is arranged in such a relationship with the pin 82 that the opening of the recess 80 is positioned in registry with the pin 82 in all switch mode positions of the cylinder 60 except for the LOCK mode position. Furthermore, the opening of the recess 80 is positioned in registry with the pin 82 during longitudinal movement of the cylinder 60 when positioned in any of the switch mode positions except for the LOCK mode position.

In accordance with the present invention and with reference again to FIGS. 5 and 6, the pin 82 is movable into and out of the recess 80 in response to a movement of the transmission shift lever 30 into and out of the PARK mode position. To this end, the mechanical means 90 includes means for moving the pin 82 into and out of the FIG. 5 phantom-line condition upon movement of the transmission control lever 38 away from and toward the position corresponding with the transmission PARK mode. Such means for moving includes means 112 for biasing the pin 82 from the FIG. 5 phantom-line condition to the FIG. 5 solid-line condition and means 114 for forcibly moving the pin 82 in opposition to the biasing means 112 so that the pin 82 moves from the FIG. 5 solid-line condition to the FIG. 5 phantom-line condition. As seen in FIG. 5, the biasing means 112 includes a compression spring operatively mounted within the cap-like member 106 for acting between cap-like member 106 and the rib 96.

It will be understood from the foregoing that when pin end portion 94 is positioned within the recess 80, the cylinder 60 is prevented from moving to the LOCK mode position by the cooperation between the pin 82 and a wall, indicated 124, of the recess 80. More specifically and inasmuch as the recess wall 124 must travel along an annular path as the cylinder 60 is rotated between preselected switch modes, forced rotational movement of the cylinder 60 when the pin end portion 94 is positioned within the recess 80 moves the recess wall 124 into abutting relationship with the pin end portion 94 so that further rotational movement is prevented. Accordingly, the recess 80 is disposed in such a relationship with the pin 82 so if the pin 82 is positioned within the recess 80 and the cylinder 60 is rotated from any of the non-LOCK mode positions toward the LOCK mode position, or counterclockwise as viewed in FIGS. 4 and 5, the recess wall 124 engages the pin end portion 94 when the cylinder 60 is positioned between the accessory and lock mode positions. On the other hand, when the pin end portion 94 is positioned out of the recess 80, the pin 82 is not in a condition to prevent or obstruct permitted rotation of the cylinder 60 between switch mode positions.

With reference again to FIGS. 2 and 5, the means 114 for forcibly moving the pin 82 from the FIG. 5 solid-line position to the FIG. 5 phantom-line position includes an actuator member 116 having a body portion 118 and a shank portion 122 intregally joined to the body portion 18 so as to extend to one side thereof. The body portion 118 is positioned within the guide member 98 for sliding movement relative to and along the length thereof and generally across the end portion 92 of the pin 82. The guide member 98 defines a guide track within which the body portion 118 is positioned so that as the actuator member 116 is slidably moved along the guide member 98, the actuator member 116 is guided along a linear path between preselected positions of displacement. Defined between the ends of the body portion 118 is a camming surface 120 which is generally sloped with respect to the permitted path of sliding movement of the actuator member 116 so that as the actuator member 116 is moved between preselected positions of displacement, the cam surface 116 and pin end portion 92 act as cam and cam follower to force the pin 82 from the FIG. 5 solid-line position toward the FIG. 5 phantom-line position and to permit the spring 76 to move the pin 82 from the FIG. 5 phantom-line position toward the FIG. 5 solid-line position.

With reference again to FIGS. 1 and 2, there is provided a cable arrangement 126 operatively connected between the transmission 26 and the actuator member 116 for effecting movement of the actuator member 116 between the preselected positions of displacement relative to the guide member 98 as the transmission shift lever 30 is moved between any of the transmission mode positions. More specifically, the cable arrangement 126 includes a cable 128 which is operatively coupled or bound at its opposite ends to the transmission control member 38 and the shank portion 122 of the actuator member 116 so that movement of the transmission shift lever 30 between transmission mode positions operatively moves the actuator member 116 between the preselected positions of displacement. The cable arrangement 126 further includes an elongated sheath 130 within which the cable 128 is housed and which is suitably anchored at its opposite ends so that movement of the transmission control member 38 effects a sliding movement of the cable 128 longitudinally of the sheath 130 and so that the aforedescribed movement of the cable 128 is guided by the sheath 130.

With reference again to FIG. 2, the guide member 98 is mounted upon the assembly casing 42 so that its generally tubular configuration is disposed generally parallel to the longitudinal axis of the steering shaft 36 when the assembly 20 is operatively mounted within the steering column 32. Inasmuch as the linear path of movement of the actuator member 116 extends longitudinally of the guide member 98, it is believed that the disposition of the guide member 98 relative to the steering shaft 36 permits the end of the cable 128 attached to the guide member 98 to move along a path parallel to the steering shaft 36 when acting upon the guide member 98 and thereby contribute to a relatively neat and compact construction of the steering column 32.

In accordance with the present invention and with reference again to FIG. 5, the actuator member 116 is arranged along the length of the guide member 98 so that when the transmission shift lever 30 is positioned in any of the non-PARK mode positions, the pin end portion 94 of the pin 82 is received by the recess 80 and so that when the shift lever 30 is positioned in the PARK mode position, the pin end portion 94 is withdrawn from the recess 80. To this end and when the shift lever 30 is positioned in any of the non-PARK mode positions, the actuator member 116 is positioned along the length of the guide member 98 so that the camming surface 120 maintains the pin 82 within the recess 80. As the shift lever 30 is moved between non-PARK modes, the pin 82 is permitted to move toward and away from the bottom of the recess 80 as the camming surface 120 slidably moves across the pin end portion 92 but not by an amount sufficient to withdraw the end portion 94 from the opening of the recess 80. It will be understood that the pin 82 is held by the guide member 98 and cap 106 so that the pin 82 is restrained from movement transverse to its longitudinal axis. Hence, as long as any part of the pin end portion 94 is positioned within the opening of the recess 80, the cylinder 60 is prevented from being rotated to the LOCK mode position. Furthermore and when the shift lever 30 is positioned in the PARK mode, the actuator member 116 is positioned along the length of the guide member 98 so that the camming surface 120 permits the spring 76 to maintain the pin end portion 94 out of the recess 80.

It follows from the foregoing that when the keyway cylinder 60 is positioned in a non-LOCK mode position and the transmission 26 is positioned in a non-PARK mode, the cylinder 60 is prevented from being moved to the LOCK mode position. Hence the steering column 32 of the vehicle 22 cannot be locked by the steering lock assembly 20 nor can the key 64 be removed from the keyway slot 62 unless the transmission shift lever 30 is moved to the PARK mode position. Inasmuch as a vehicle 22 could possibly be in motion when the transmission 26 is in a non-PARK mode, the steering lock assembly 20 provides an advantage in that the steering column 32 cannot be locked by the assembly 20 as long as the transmission 26 is in a non-PARK mode. Hence, the steering lock assembly 20 is thereby believed to enhance the safety of vehicle operation.

Another feature of the steering lock assembly 20 relates to the fact that once the keyway cylinder 60 is positioned in LOCK mode position, the recess 80 is positioned out of registry with the pin 82. Therefore, any attempted movement of the transmission lever 30 out of the PARK mode position while the keyway cylinder 60 is in the LOCK mode position is limited by the consequential abutment of the pin end portion 94 against the cylindrical periphery of the cylinder 60 as the pin 82 is moved by the camming surface 120 toward the cylinder 60. Hence, the transmission 26 cannot be moved out of the PARK mode unless the keyway cylinder 60 is moved out of the LOCK mode position so that the recess 80 is positioned in registry with the pin 82. Such a feature provides a deterrent to theft of the vehicle 20 by a person not in possession of the key 64, and the steering lock assembly 20 is believed to provide a further advantage in this respect.

Still another feature of the steering lock assembly relates to the cooperation between the keyway cylinder 60 and the mechanical means 90 so that the transmission shift lever 30 and the keyway cylinder 90 cannot be positioned in a normal condition of use so that the position of one unduly binds the movement of the other. For example, the keyway cylinder 60, when positioned in any of its LOCK or non-LOCK mode positions does not cooperate with the mechanical means 90 to prevent longitudinal movement of the pin 82 unless the recess 80 is out of registry with the pin 82. Such a feature is believed to be due to the lack of an interconnection between the keyway cylinder 60 and mechanical means 90 wherein pressure is applied to the pin 82 in a direction transversely of its longitudinal axis while the cylinder 60 is positioned in its normal LOCK or non-LOCK mode positions. Hence, the steering lock assembly 20 is further advantageous in this respect.

The method of the invention includes the steps in preventing movement of the key-operable from the non-LOCK switch mode to the LOCK mode unless the transmission control member is in the PARK mode position. Such steps include the providing of the mechanical means 90 and connecting the mechanical means 90 between the switch assembly 54 and the transmission 26 so that when the transmission control member 26 is positioned out of the PARK mode, rotational movement of the keyway cylinder 60 from a non-LOCK mode position to the LOCK mode position is prevented by the mechanical means 90 and so that when the transmission control member 26 is positioned in the PARK mode position, rotational position to the LOCK mode position is permitted.

It will be understood that numerous modifications and substitutions can be had to the aforedescribed embodiment without departing from the spirit of the invention. For example, although the actuator member 116 has been shown and described as including an elongated body portion 118 adapted to move linearly along the guide member, the actuator member 116 may take any of a number of forms for camming the pin 82 between the FIG. 5 solid-line condition and the FIG. 5 phantom-line condition. Accordingly, the aforedescribed embodiment is intended for purposes of illustration and not as limitation.

What is claimed is:

1. A steering lock assembly for utilization in a vehicle having a steering arrangement and a transmission control member mounted for movement between one position corresponding to a PARK mode and another position corresponding to a non-PARK mode, said assembly comprising:

a key-operable switch including a housing mountable in a generally stationary condition within the vehicle and a keyway cylinder mounted within said housing for rotational movement relative thereto between first and second positions of rotational movement and including means defining an abutment surface for movement along an annular path as said keyway cylinder is rotated from said second position toward said first position;

means associated with said switch for locking the steering arrangement of the vehicle when the keyway cylinder is positioned in said first position; and mechanical means associated with said switch for couplement to the transmission control member for movement in response to movement thereof and for cooperating with the keyway cylinder so that when the transmission control member is positioned in a position corresponding to a non-PARK mode and said keyway cylinder is positioned in said second position of rotational movement, said keyway cylinder is prevented from being rotated from said second position to said first position so that the vehicle steering arrangement cannot be locked by said locking means as long as the transmission control member is positioned in a non-PARK mode position, said mechanical means including a stop member mounted for positioning in the path of said abutment surface when the transmission control member is moved out of the one position corresponding to the PARK mode for preventing the return of said keyway cylinder from said second position to said first position until the transmission control member is returned to the PARK mode position, said stop member cooperating with the transmission control member so that movement of said stop member into the path of said abutment surface is effected as the transmission control member is moved out of the one position corresponding with the PARK mode position.

2. The assembly of claim 1 wherein said mechanical means is adapted to permit rotational movement of said keyway cylinder from said second position to said first position when said transmission control member is positioned in the position corresponding to the PARK mode.

3. The assembly of claim 1 wherein said stop member is cooperable with the transmission control member and is mounted for movement out of the path of said abutment surface in response to movement of the transmission control member into the PARK mode position so that when the transmission control member is moved into the PARK mode position, rotational movement of said cylinder from said second position to said first position is permitted.

4. The assembly of claim 3 wherein said mechanical means includes an actuator member supported by said housing for movement relative thereto and connectable to the transmission control member for movement therewith as the transmission control member moves into and out of the PARK mode position and wherein said actuator member and said stop member act as cam and cam follower for moving said stop member into and out of cooperating relationship with said keyway cylinder as the transmission control member is moved into and out of the PARK mode position.

5. The assembly as defined in claim 1 wherein said keyway cylinder defines a generally cylindrical periphery and said means defining an abutment surface is associated with the cylindrical periphery for movement along an annular path as said keyway cylinder is rotated from said second position toward said first position.

6. The assembly of claim 5 wherein said stop member includes a pin supported by said housing and adjacent said keyway cylinder for movement out of sand into said path of said abutment surface in coordination with the movement of the transmission control member into and out of the PARK mode position.

7. The assembly of claim 6 wherein said mechanical means includes an actuator member supported by said housing for movement relative thereto and connectable to the transmission control member for movement therewith as the transmission control member moves into and out of the PARK mode position and wherein said actuator member and said pin act as cam and cam follower for moving said pin out of and into said path of said abutment surface as the transmission control member is moved into and out of the PARK mode position.

8. The assembly of claim 7 wherein said actuator member includes an elongated body portion mounted for sliding movement relative to said housing and said body portion defines a camming surface extending therealong, said mechanical means includes means for biasing said pin out of said path of said abutment surface and into engagement with said camming surface, and said camming surface is adapted to move in sliding contact with said pin as said actuator member is moved by the transmission control member into and out of the PARK mode position so that said body portion and said biasing means cooperate to move said pin out of and into said path of said abutment surface as the transmission control member is moved into and out of the PARK mode position.

9. The assembly of claim 8 wherein said actuator member is supported by said housing for sliding movement along a generally linear path as the transmission control member is moved away from and toward the PARK mode position.

10. The assembly of claim 5 wherein said keyway cylinder defines a recess in its periphery and said abutment surface is provided by a wall of said recess.

11. A steering lock assembly for utilization in a vehicle having a steering arrangement and a transmission control member mounted for movement between one position corresponding to a PARK mode and another position corresponding to a non-PARK mode, said assembly comprising:

a key-operable switch including a housing mountable in a generally stationary condition within the vehicle and a keyway cylinder mounted within said housing for rotational movement relative thereto between first and second positions of rotational movement;

means associated with said switch for locking the steering arrangement of the vehicle when the keyway cylinder is positioned in said first position; and mechanical means associated with said switch for couplement to the transmission control member for movement in response to movement thereof and for cooperating with the keyway cylinder so that when the transmission control member is positioned in a position corresponding to a non-PARK mode and said keyway cylinder is positioned in said second position of rotational movement, said keyway cylinder is prevented from being rotated from said second position to said first position so that the vehicle steering arrangement cannot be locked by said locking means as long as the transmission control member is positioned in a non-PARK mode position, said keyway cylinder being mounted within said housing for axial movement relative thereto between first and second positions of axial displacement and wherein said mechanical means is adapted to permit unobstructed movement of said cylinder between said first and second positions of axial displacement whether the transmission control member is positioned in a non-PARK mode position or the PARK mode position.

12. The assembly of claim 1 wherein said keyway cylinder is operatively mounted within said housing means for rotation between said second position of rotational movement and a third position of rotational movement wherein said second position of rotational movement is arranged intermediate of said first and third positions of rotational movement and said mechanical means is adapted to permit rotational movement of said keyway cylinder between said second and third positions of rotational movement whether or not said transmission control member is positioned in a non-PARK mode position.

13. A steering lock assembly for incorporation within a steering column of a vehicle wherein the steering column includes a generally stationary casing and a steering shaft mounted within the casing for rotation relative thereto and wherein the vehicle includes a transmission having a transmission control member mounted for movement between a position corresponding to a PARK mode and another position corresponding to a non-PARK mode, said assembly comprising:

housing means adapted to be connected to the casing of the steering column of the vehicle and in a stationary condition with respect thereto;

a key-operable switch including a keyway cylinder operatively mounted within said housing means for rotation relative thereto between first and second positions of rotational movement and including means defining an abutment surface for movement along an annular path as said keyway cylinder is rotated from said second position toward said first position;

locking means associated with said switch and cooperable with the steering shaft of the vehicle for limiting rotational movement of the steering shaft relative to the steering column casing when the keyway cylinder is positioned in said first rotational position; and mechanical means associated with said switch for connection to the transmission control member and for cooperating with said keyway cylinder in response to a movement of the transmission control member into and out of the PARK mode position so that when the transmission control member is moved out of the PARK mode position and the keyway cylinder is positioned in said second rotational position, the keyway cylinder is prevented from being rotated to said first rotational position and so that rotational movement of the steering shaft within the casing cannot be limited by said locking means unless the transmission control member is returned to the PARK mode position, said mechanical means including a stop member mounted for movement into and out of the path of said abutment surface and cooperable with the transmission control member so that movement of said stop member into the path of said abutment surface is effected as the transmission control member is moved out of the PARK mode position and so that movement of said stop member into the path of said abutment surface is effected as the transmission control member is moved into the PARK mode position.

14. The assembly of claim 13 wherein said stop member is cooperable with the transmission control member and is mounted for movement out of the path of said abutment surface in response to movement of the transmission control member into the PARK mode position so that when the transmission control member is moved into the PARK mode position, rotational movement of said cylinder from said second position to said first position is permitted.

15. The assembly of claim 14 wherein said mechanical means includes an actuator member supported by said housing for movement relative thereto and connectable to the transmission control member for movement therewith as the transmission control member moves away from and toward the PARK mode position and wherein said actuator member and said stop member act as cam and cam follower for moving said stop member into and out of cooperating relationship with said keyway cylinder as aforesaid as the transmission control member is moved away from and toward the PARK mode position.

16. The assembly as defined in claim 13 wherein said keyway cylinder defines a generally cylindrical periphery and said means defining an abutment surface is associated with the cylindrical periphery for movement along an annular path as said keyway cylinder is rotated from said second position toward said first position.

17. The assembly of claim 16 wherein said stop member includes a pin supported by said housing and adjacent said keyway cylinder for movement into and out of said path of said abutment surface in coordination with the movement of the transmission control member away from and toward the PARK mode position.

18. The assembly of claim 17 wherein said mechanical means includes an actuator member supported by said housing for movement relative thereto and connectable to the transmission control member for movement therethrough as the transmission control member moves away from and toward the PARK mode position and wherein said actuator member and said pin act as cam and cam follower for moving said pin into and out of said path of said abutment surface as the transmission control member is moved away from and toward the PARK mode position.

19. The assembly of claim 18 wherein said actuator member includes an elongated body portion mounted for sliding movement relative to said housing and said body portion defining a camming surface extending therealong, said mechanical means includes means for biasing said pin out of said path of said abutment surface and into engagement with said camming surface, and said camming surface is adapted to move in sliding contact with said pin as said actuator member is moved by the transmission control member away from and toward the PARK mode position so that the camming surface and biasing means cooperate to move said pin into and out of said path of said abutment surface as the transmission control member is moved away from and toward the PARK mode position.

20. The assembly of claim 19 wherein said actuator member is supported by said housing for sliding movement along a generally linear path as the transmission control member is moved away from and toward the PARK mode position.

21. The assembly of claim 16 wherein said keyway cylinder defines a recess in its periphery and said abutment surface is provided by a wall of said recess.

22. A steering lock assembly for incorporation within a steering column of a vehicle wherein the steering column includes a generally stationary casing and a steering shaft mounted within the casing for rotation relative thereto and wherein the vehicle includes a transmission having a transmission control member mounted for movement between a position corresponding to a PARK mode and another position corresponding to a non-PARK mode, said assembly comprising:

housing means adapted to be connected to the casing of the steering column of the vehicle and in a stationary condition with respect thereto;

a key-operable switch including a keyway cylinder operatively mounted within said housing means for rotation relative thereto between first and second positions of rotational movement;

locking means associated with said switch and cooperable with the steering shaft of the vehicle for limiting rotational movement of the steering shaft relative to the steering column casing when the keyway cylinder is positioned in said first rotational position; and mechanical means associated with said switch for connection to the transmission control member and for cooperating with said keyway cylinder in response to a movement of the transmission control member into and out of the PARK mode position so that when the transmission control member is moved out of the PARK mode position and the keyway cylinder is positioned in said second rotational position, the keyway cylinder is prevented from being rotated to said first rotational position and so that rotational movement of the steering shaft within the casing cannot be limited by said locking means unless the transmission control member is returned to the PARK mode position, said keyway cylinder being mounted within said housing for axial movement relative thereto between first and second positions of axial displacement and said mechanical means being adapted to permit unobstructed movement of said cylinder between said first and second positions of axial displacement whether the transmission control member is positioned in a non-PARK mode position or the PARK mode position.

23. The assembly of claim 13 wherein said mechanical means is adapted to prevent the movement of the transmission control member out of the PARK mode position until the keyway cylinder is rotated from the first position of rotational movement to the second position of rotational movement so that the vehicle cannot move while the rotational movement of the steering shaft is limited by said locking means.

24. A method for preventing movement of a key-operable vehicle switch between switch modes wherein the switch includes a housing mounted in generally stationary condition within the vehicle and a keyway cylinder mounted within the housing for rotational movement relative thereto between first and second positions of rotational movement and including an abutment surface adapted to travel along an annular path as the keyway cylinder is rotated from the second rotational position to the first rotational position and wherein said first and second positions of rotational movement correspond with alternative modes of the switch and wherein the vehicle in which the switch is mounted includes a transmission control member mounted for movement between one position corresponding to a PARK mode and another position corresponding to a non-PARK mode, said method comprising the steps of:

providing mechanical means including a stop member for positioning within the annular path of the abutment surface in response to a movement of the transmission control member into and out of the PARK mode position;

interconnecting the transmission control member and the key-operable switch by operatively connecting the mechanical means between the switch and the transmission control member so that when the transmission control member is positioned out of the PARK mode, the stop member is positioned in the path of the abutment surface and rotational movement of the keyway cylinder from the second rotational position to the first rotational position is prevented by the interaction between the stop member and the abutment surface and so that when the transmission control member is positioned in the PARK mode position, the stop member is positioned out of the path of the abutment surface and rotational movement of the keyway cylinder from the second rotational position to the first rotational position is permitted; and moving the transmission control member out of the PARK mode position to thereby move the stop member into the path of the abutment surface and to prevent the movement of the keyway cylinder from the second position of rotational movement to the first position of rotational movement.

25. The method as defined in claim 24 wherein said step of moving coordinates the movement of the stop member with the movement of the transmission control member so that movement of the transmission control member out of the PARK mode position moves the stop member into the path of the abutment surface of the keyway cylinder and so that movement of the transmission control member into the PARK mode position moves the stop member out of the path of the abutment surface.

26. The method as defined in claim 24 wherein said step of moving coordinates the position of the transmission shift member with the position of the keyway cylinder within the housing so that when the transmission shift lever is positioned out of the PARK mode position, rotational movement of the keyway cylinder from the second rotational position to the first rotational position is prevented and so that when the transmission control member is positioned in the PARK mode position, rotational movement of the keyway cylinder from the second rotational position to the first rotational position is permitted.

27. A method for preventing the steering arrangement of a vehicle from locking wherein the vehicle includes a steering lock assembly having a key-operable switch movable between switch modes and locking means associated with the key-operable switch for selectively locking and unlocking the steering arrangement when the switch is moved between switch modes and wherein the switch includes a housing mounted in a generally stationary condition within the vehicle and a keyway cylinder mounted within the housing for rotational movement relative thereto between first and second positions of rotational movement and including an abutment surface adapted to travel along an annular path as the keyway cylinder is rotated from the second rotational position to the first rotational position and wherein the first rotational position corresponds with the switch mode at which the locking means locks the steering arrangement and wherein the vehicle further includes a transmission control member mounted for movement between one position corresponding to a PARK mode and another position corresponding to a non-PARK mode, said method comprising the steps of:

providing mechanical means including a stop member for positioning into and out of the annular path of the abutment surface in response to a movement of the transmission control member into and out of the PARK mode position;

interconnecting the transmission control member and the key-operated switch by operatively connecting the mechanical means between the switch and the transmission control member so that when the transmission control member is positioned out of the PARK mode, the stop member is positioned in the path of the abutment surface and rotational movement of the keyway cylinder from the second rotational position to the first rotational position is prevented by the interaction of the stop member and the abutment surface and so that when the transmission control member is positioned in the PARK mode position, the stop member is positioned out of the path of the abutment surface and movement of the keyway cylinder from the second rotational position to the first rotational position is permitted; and moving the transmission control member out of the PARK mode position to thereby move the stop member into the path of the abutment surface and to prevent the movement of the keyway cylinder from the second rotational position to the first rotational position so that the locking means is thereby prevented from locking the steering arrangement.

28. In a motor vehicle having an ignition switch and a transmission that is shiftable between PARK and non-PARK positions, a shift lever for shifting said transmission, a steering column housing, a steering shaft mounted in said column housing for rotation about its longitudinal axis, a coincidental key-operated lock operatively associated with the ignition switch of the vehicle and further operable to lock the steering shaft against rotation with the column housing when the key is withdrawn from the lock, the lock including a lock housing, a cylinder rotatably and translatably disposed within the lock housing, said cylinder being movable by a key and operable to lock and unlock the steering shaft, a method for preventing the withdrawal of said key when said transmission is in non-PARK position comprising the steps of:

forming an opening in said lock housing adjacent said cylinder, providing a slot in said cylinder disposed in registry with said opening through said lock housing, disposing a stop pin in said opening through said lock housing and in proximity to said slot wherein said stop pin is spring-biased out of engagement with said slot;

moving said pin into engagement with said slot when the transmission shift lever is shifted out of the PARK position to a non-PARK position to thereby limit the rotational and translational movement of said cylinder to the approximate dimensions of said slot, maintaining said stop pin in engagement with said slot when said transmission is in the non-PARK position; and releasing said pin for disengagement with said slot when said transmission shift lever is moved into its PARK position.

* * * * *

UNITED STATES PATENT AND TRADEMARK OFFICE
CERTIFICATE OF CORRECTION

PATENT NO. : 4,884,423
DATED : December 5, 1989
INVENTOR(S) : Ricky L. Fancher

It is certified that error appears in the above-identified patent and that said Letters Patent is hereby corrected as shown below:

IN THE SPECIFICATION:

Column 3, line 64, after "26" insert --.--. (period)

Column 6, line 57, after "end portions", delete "9" and insert --92--.

IN THE CLAIMS:

Column 11, line 47, after "out of", delete "sand" and insert --and--.

Column 14, line 17, delete "therethrough" and insert --therewith--.

Column 14, line 27, delete "defining" and insert --defines--.

Column 18, line 1, delete "said" and insert --such--.

Signed and Sealed this

Sixth Day of November, 1990

Attest:

HARRY F. MANBECK, JR.

Attesting Officer

Commissioner of Patents and Trademarks